W. J. MacFARLAND & W. G. EATON.
REVERSIBLE DIE.
APPLICATION FILED MAY 1, 1908.
916,930.
Patented Mar. 30, 1909.
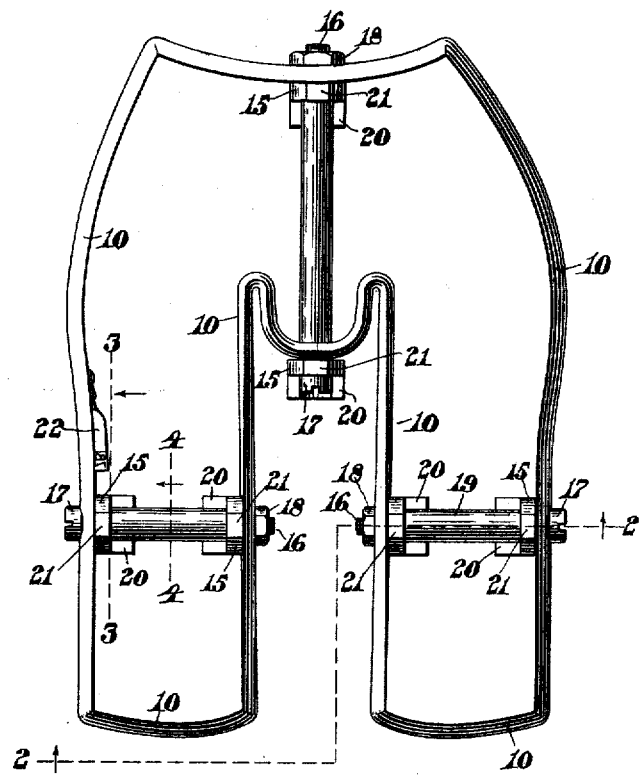
Fig. 1.
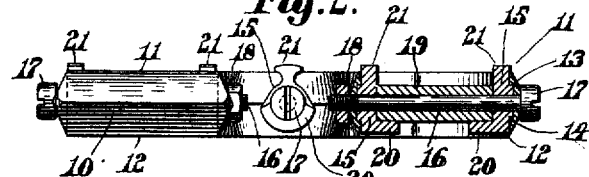
Fig. 2.
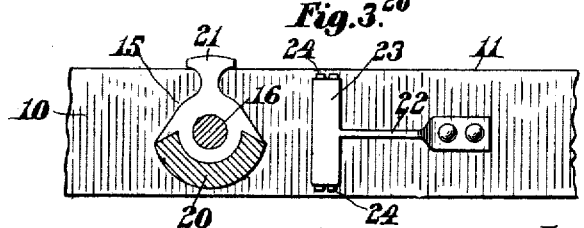
Fig. 3.
Fig. 4.
Witnesses:
Howard Hanscom
Nathan C. Lombard
Inventors.
William J. MacFarland,
William G. Eaton,
by Walter E. Lombard, Atty.

UNITED STATES PATENT OFFICE.

WILLIAM J. MacFARLAND, OF EVERETT, AND WILLIAM G. EATON, OF BOSTON, MASSACHUSETTS.

REVERSIBLE DIE.

No. 916,930.　　　Specification of Letters Patent.　　　Patented March 30, 1909.

Application filed May 1, 1908. Serial No. 430,393.

*To all whom it may concern:*

Be it known that we, WILLIAM J. MACFARLAND and WILLIAM G. EATON, citizens of the United States of America, and residents of, respectively, Everett, in the county of Middlesex, and Boston, in the county of Suffolk, both in the State of Massachusetts, have invented certain new and useful Improvements in Reversible Dies, of which the following is a specification.

In the manufacture of certain articles, as, for instance, boots and shoes, it is frequently necessary to cut blanks from leather or other material which shall be rights and lefts and it is desirable that the members of each pair should be exactly the same shape with the exception that one is a reverse of the other.

In order to provide a cutting die or blade which is adapted to cut a blank of a given shape and then by reversing it cut the counterpart thereof in reverse, is the object of the present invention.

The invention consists of providing a continuous cutting blade having two edges each of which is adapted to be used for cutting blanks, said blades being provided at various points with members projecting above the upper cutting edge to receive the impact of a movable member when the lower cutting edge is in use.

The invention further consists in making these members adapted to receive the impact of the movable member rotatable and preferably weighted in such manner that when the die itself is overturned the devices will rotate about their axes so that the impact receiving portions of the devices will always remain at the top thus preventing injury to the upper edge of the reversible die when the lower edge is operating upon a piece of material to cut a blank.

The invention further consists in a spring arm provided with a double ended yieldable impression member which is adapted in the operation of cutting to impress upon the blank suitable designating characters.

The invention further consists in certain novel features of construction and arrangement of parts which will be readily understood by reference to the description of the drawings and to the claims hereinafter given.

Of the drawings: Figure 1 represents a plan of a reversible die embodying the features of this invention. Fig. 2 represents a transverse section through a portion of the same, the cutting plane being on line 2—2 on Fig. 1. Fig. 3 represents a sectional detail of the same, drawn to an enlarged scale, the cutting plane being on line 3—3 on Fig. 1, and Fig. 4 represents a sectional detail of the same, drawn to an enlarged scale, the cutting plane being on line 4—4 on Fig. 1.

Similar characters designate like parts throughout the several figures of the drawings.

In the drawings, 10 represents a suitable cutting blade which is made continuous as shown in Fig. 1. The outline of this cutting blade may be of any desired form to cut blanks of any preferred shape, as, for instance, the upper of a boot or shoe, as indicated in Fig. 1, or it may be of some entirely dissimilar outline to cut other portions of a shoe or any other article. The blade portion 10 is provided with two cutting edges 11 and 12, these two edges being in the same vertical plane. At various points the inner wall of the blade 10 is provided with cylindrical depressions 13 into each of which fits a cylindrical hub 14 of a rotatable member 15 through a hole in which extends a bolt 16, the axis of which is midway between the two cutting edges 11 and 12. This bolt preferably extends from one portion of the cutting blade to another opposed portion thereof to stiffen the die and prevent its expansion during the operation of cutting.

One end of the bolt is provided with the usual head 17 while the opposite end has threaded thereto a nut 18. When the bolt 16 extends from one portion of the cutting blade 10 to another opposed portion, as is shown in the drawings, either end of the bolt 16 has mounted thereon a rotatable member 15, these members being separated by means of a tubular member 19 interposed between the inner walls thereof. Each device 15 is provided with a suitable weight 20, the outer end of which is well within the lower cutting edge 12 at all times, while each member is also provided diametrically opposite the weight 20 with an arm 21 extending above the upper edge 11 of the cutting blade 10 which arm is adapted to receive the impact of a movable member of any suitable die press when the die is being used for the purpose of cutting the necessary blanks.

The rotatable weighted member 15 may be inside the cutting blade 10, as indicated at the bottom of Fig. 1, or it may be interposed between the head 17 and the outer wall of the cutting blade 10, as indicated in the central portion of said figure without altering the principles of this invention.

By having the hub 14 extend into a depression 13 in the wall of the cutting blade 10 the impact of the movable member on the die press against the upper end of the arm 21 causes the pressure to be transmitted to the cutting blade at a point directly over the cutting edge which is an obvious advantage.

It is self-evident that, by so adjusting the various portions of the die, the rotatable members 15 will be freely revoluble about the axes of the bolts 16 and when the die is overturned to cut a blank in reverse the weights 20 will act upon the impact-receiving members 15 to cause them to move about the axes of the bolts 16 so that the arms 21 will still retain a vertical position immediately above the bolts 16 and project above the upper edge of the blade 10 so that no matter which edge of the blade is uppermost the devices 15 will automatically adjust themselves to prevent any injury to the cutting edges during the operation of the die press.

Secured at some desirable point to the inner wall of the cutting blade 10 is a T-shaped spring arm 22 one end of which has secured thereto a vertical member 23 each end of which is provided with a suitable projecting character or impressing face 24 immediately below the cutting edge 11 or 12 so that during the operation of cutting the blank the characters 24 will make a suitable impression upon the upper face of the blank being cut, the spring arm 22 permitting the member 23 to yield slightly so that the impression thus made will not be sufficiently deep to injure the material being cut.

This makes a very convenient form of reversible die which is adapted to cut first a right and then a left of any required shaped blank for use in the manufacture of various articles, as, for instance boots and shoes.

The operation of the invention and its many advantages it is believed will be fully apparent without any further description.

Having thus described our invention, we claim:

1. A reversible die provided with a bolt extending between two blade portions midway their edges; and a rotatable member on said bolt provided with an arm extending beyond the edge of said blade portion.

2. A reversible die provided with a bolt extending between two blade portions midway their edges; and a rotatable weighted member on said bolt provided with an arm extending beyond the edge of said blade portion.

3. A reversible die provided with a bolt extending between two blade portions midway their edges; a rotatable weighted member on each end of said bolt provided with an arm extending beyond the edge of said blade portion; and a tubular member surrounding said bolt between said rotatable members.

4. A reversible die provided with a member having an impressing face on each end slightly within the edge of the blade of said die and adapted to yield under pressure.

5. A reversible die provided with a spring arm secured to the inner face of a blade and having a cross member extending transversely of said blade, each end of which is provided with a projecting character slightly within the edge of the blade of said die, said spring arm being adapted to yield when pressure is applied to either end of said cross arm.

6. A reversible die provided with a bolt extending between two blade portions midway their edges; a rotatable member on each end of said bolt, said members each being provided with an arm extending beyond the edge of the blade portions of said die; and means interposed between said rotatable members to maintain them in separated position.

7. A reversible die provided with a bolt extending through two blade portions of said die midway their edges; means on said bolt preventing end movement thereof; a rotatable member on each end of said bolt provided with an arm extending beyond the edge of said blade portion; and a tubular member surrounding said bolt between said blade portions.

8. A reversible die provided with a bolt extending through two blade portions of said die midway their edges; means on said bolt preventing end movement thereof; a rotatable member on said bolt provided with an arm extending beyond the edge of said blade portion; and a tubular member surrounding said bolt between said blade portions.

Signed by us at 7 Water st., Boston, Mass., this 29th day of April, 1908.

WM. J. MacFARLAND.
WILLIAM G. EATON.

Witnesses:
EDNA C. CLEVELAND,
WALTER E. LOMBARD.